Figure 1:
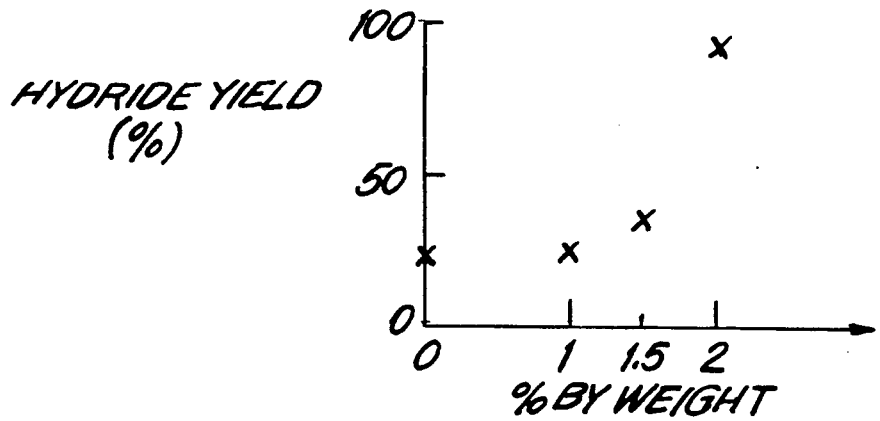

United States Patent
Knott et al.

Patent Number: 5,198,207
Date of Patent: Mar. 30, 1993

[54] METHOD FOR THE PREPARATION OF ACTIVE MAGNESIUM HYDRIDE-MAGNESIUM HYDROGEN STORAGE SYSTEMS, WHICH REVERSIBLY ABSORB HYDROGEN

[75] Inventors: Wilfried Knott, Essen; Klaus-Dieter Klein, Mulheim an der Ruhr; Götz Koerner, Essen, all of Fed. Rep. of Germany

[73] Assignee: Th. Goldschmidt AG, Essen, Fed. Rep. of Germany

[21] Appl. No.: 785,298

[22] Filed: Oct. 30, 1991

[30] Foreign Application Priority Data

Dec. 8, 1990 [DE] Fed. Rep. of Germany ....... 4039278

[51] Int. Cl.$^5$ ............... C01B 6/04; C01B 3/00; B01J 31/12
[52] U.S. Cl. .................... 423/647; 420/900; 502/526
[58] Field of Search .......... 502/526; 420/900; 423/647, 644

[56] References Cited

U.S. PATENT DOCUMENTS

| | | | |
|---|---|---|---|
| 3,479,165 | 11/1969 | Lyon | 423/647 |
| 4,537,761 | 8/1985 | Reed et al. | 423/644 |
| 4,554,152 | 11/1985 | Bogdanovic | 420/900 |

FOREIGN PATENT DOCUMENTS

0112548 7/1984 European Pat. Off.

Primary Examiner—Paul E. Konopka
Attorney, Agent, or Firm—Anderson Kill Olick & Oshinsky

[57] ABSTRACT

A method is disclosed for the preparation of active magnesium hydride-magnesium-hydrogen storage systems, which reversibly absorb hydrogen, with addition of a catalyst for the absorption of hydrogen with the formation of hydride. Magnesium hydride particles $\leq 400$ μm in diameter are added in an amount of at least 1.2% by weight, based on the magnesium to be hydrogenated, as catalyst during the first hydrogenation to the finely divided magnesium to be hydrogenated. The hydrogenation is carried out at a temperature of $\geq 250°$ C. and a pressure of 0.5 to 5 MPa. The method is carried out with intensive stirring of the material that is being reacted.

2 Claims, 1 Drawing Sheet

METHOD FOR THE PREPARATION OF ACTIVE MAGNESIUM HYDRIDE-MAGNESIUM HYDROGEN STORAGE SYSTEMS, WHICH REVERSIBLY ABSORB HYDROGEN

BACKGROUND OF THE INVENTION

The invention relates to a method for the preparation of active magnesium hydride-magnesium-hydrogen storage systems, which reversibly absorb hydrogen, with addition of a catalyst for the absorption of hydrogen under the formation of hydride.

BACKGROUND INFORMATION AND PRIOR ART

Of the known metal hydride/metal systems which come into consideration as reversible hydrogen storage systems, the $MgH_2$—Mg system is distinguished by the highest proportion by weight of reversibly bound hydrogen (7.65% by weight) and, thus, by the highest energy density per unit of weight of the storage material (2332 Wh/kg).

Storage systems of magnesium hydride generate hydrogen upon heating to certain temperatures. The liberated hydrogen may, for example, be used for the operation of a combustion motor. By subsequent treatment with hydrogen, the system is reconstituted into the hydride form. It is known, however, that there are considerable difficulties during the initial hydrogenation of the finally divided magnesium.

The unsatisfactory kinetics of this system have until now stood in the way of the application of such storage systems for mobile purposes. For example, it is thus known that pure magnesium can be hydrogenated only under drastic conditions and even then only very slowly and incompletely.

Attempts have therefore been made to improve the ability to hydrogenate magnesium by doping or alloying the magnesium with other metals, such as Al, In, Fe, $Mg_2Ni$, $Mg_2Cu$ or $LaNi_5$. Improvements with respect to kinetics could be achieved by these means. However, important disadvantages, such as the need for drastic conditions for the first hydrogenation of the doped magnesium, remained. In addition, the storage capacities of such systems were below the theoretically expected values.

Based on this prior art, the European Pat. No. 0 112 548 is concerned with the problem of improving the magnesium hydride-magnesium-hydrogen storage system, and particularly with improved doping. The European Pat. No. 0 112 548 teaches a method of the above-described type with the distinguishing feature that magnesium hydride or metallic magnesium, in finely divided form, is reacted by contact with a solution of a metal complex and/or an organometallic compound of a metal of the 4th to the 8th sub-group of the Periodic System, optionally in the presence of hydrogen, the respective transition metal being deposited at the surface of the magnesium hydride and/or magnesium particles.

However, a disadvantage of this procedure is the need to use metal complexes or organometallic compounds, which are generally expensive, frequently dangerous to handle and/or toxic. Such a method therefore cannot be entirely satisfactory for economic and environmental reasons and in view of the instances of danger to the personnel charged with carrying out the method.

OBJECT OF THE INVENTION

The present invention therefore is concerned with the technical problem of the catalysis of the initial hydrogenation reaction under conditions at which the disadvantages described above do not occur.

SUMMARY OF THE INVENTION

Surprisingly, it was found magnesium can be hydrogenated without problems if, pursuant to the invention, magnesium hydride particles $\leq 400$ $\mu$m in diameter are added as catalyst in an amount of at least 1.2% by weight, based on the magnesium to be hydrogenated, to the finely divided magnesium to be hydrogenated during the first or initial hydrogenation and the hydrogenation is carried out at a temperature of $\geq 250°$ C. and a pressure of 0.5 to 5 MPa.

The difficulties in the original hydrogenation of the magnesium referred to above are successfully overcome by the inventive procedure. After the initial hydrogenation, the subsequent hydrogenation/dehydrogenation cycles proceed substantially smoother.

It is of particular advantage thoroughly to mix the material to be reacted during the hydrogenation by constant stirring. Such stirring accomplishes that the resulting magnesium hydride is obtained as a product which is finely divided, flows freely, and can be handled readily. The hydrogenation reaction itself is also favored by the stirring.

It is believed that the finely divided magnesium hydride, added to the magnesium to be hydrogenated, exerts an autocatalytic effect. This is evident from the following experimental results.

FIG. 1 shows the yield of hydride (as a percentage of the theoretical value) as a function of the amount of magnesium hydride added, which is given as a percentage of the amount of magnesium. The yield of hydride increases with the addition of finely divided magnesium hydride from 22% without any addition to 40% with an addition of 1.5% by weight and reaches 94% with an addition of 2% by weight of magnesium hydride.

Figure 2:
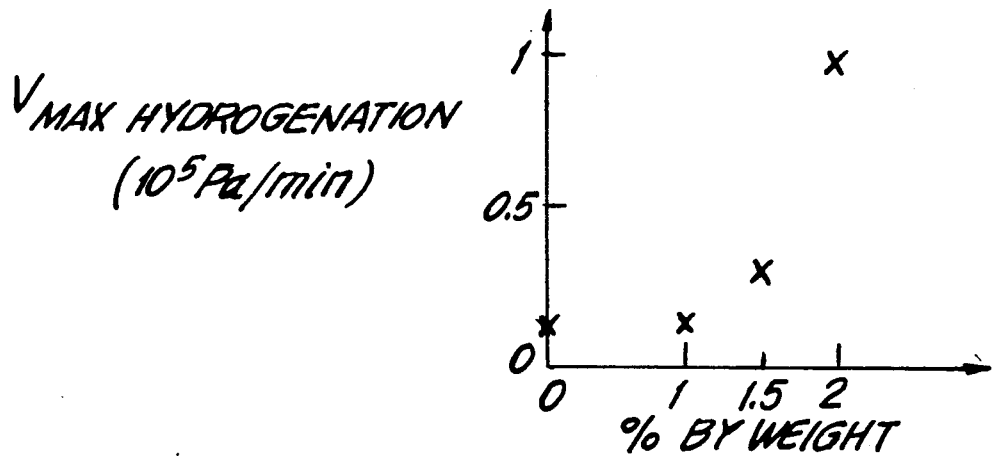

FIG. 2 shows the hydrogenation rate, measured as the pressure drop in $10^5$ Pa/min, once again as a function of the amount of magnesium hydride added. The hydrogenation rate increases by a factor of 10, as can be seen by the increase in the pressure drop from $10^4$ Pa/min to $10^5$ Pa/min upon addition of 2% by weight of magnesium hydride.

Figure 3:
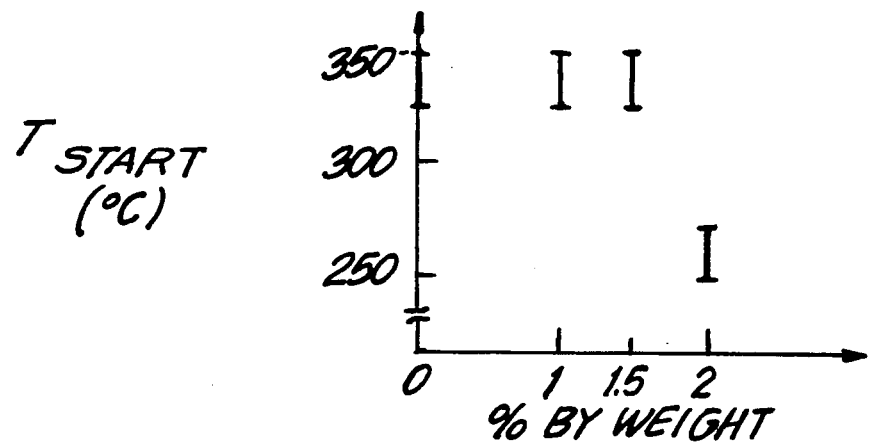

FIG. 3 shows the starting temperature of the hydrogenation reaction as a function of the amount of magnesium hydride added. Up to a content of about 1.2% by weight of magnesium hydride, the reaction sets in under the given conditions at 320° to 340° C. On the other hand, after an addition of 2% by weight of magnesium hydride, the reaction commences already at 250° to 270° C. This is an indication of the enormous lowering of the reaction threshold.

The surprising, autocatalytic effect of slight amounts of added magnesium hydride on the hydrogenation reaction of the magnesium is made believable.

The method fulfills the aforementioned conditions in that it is economical, friendly to the environment and avoids working with larger amounts of organometallic complexes or compounds.

It will be appreciated that the difficulties referred to above in the initial hydroenation of the magnesium — which is successfully overcome by the inentive procedure — do not generally apply to the subsequent hydrogentations. This of course is clear from the fact that once the hydrogenation has been initiated, magnesium hydride is present which facilitates the hydrogenation-dehydrogenation cycles.

The inventive method is explained in greater detail by means of the following example, it being understood that the example is given by way of illustration and not by way of limitation.

EXAMPLE

Magnesium powder (500 g, 20.58 moles), with an average particle size of 54 μm (270 mesh), together with 10 g (0.38 moles) of magnesium hydride, with an average particle size of 54 μm, is stirred intensively in a stirred 5 L autoclave. The autoclave is evacuated to a pressure of 133 Pa. The reactor is then filled with hydrogen to a pressure of 0.51 MPa. Subsequently, the reactor is heated to 350° C. with further constant stirring. The variations in pressure and temperature are recorded by means of a multichannel recorder. When the hydrogenation sets in at a temperature of $\geq 250°$ C., a permanent hydrogen pressure of 0.58 MPa is maintained. The reaction is concluded after about 7 hours. After cooling, the reactor is evacuated and then flushed with argon. The magnesium hydride is filled as a free-flowing powder into a baked-out vessel that is filled with argon.

Yield: 540.2 g (corresponding to 98% of the theoretical yield). The hydride content of a sample is determined gas volumetrically with $H_2CrO_4$, using the method given in ZH. Neorgh. Khim. 6, 1961. The hydride content is found to be 7.1%.

For comparison, an analysis by combustion is carried out. This method, also gives a hydride content of 7.1%.

We claim:

1. A method for the preparation of an active magnesium hydride-magnesium-hydrogen storage system, which reversibly absorbs hydrogen, with addition of a catalyst for the absorption of hydrogen under formation of hydride, which comprises adding to finely divided magnesium to be initially hydrogenated, magnesium hydride particles of $\geq 400$ μm in diameter as the catalyst in an amount of at least 1.2% by weight, based on the magnesium to be initially hydrogenated and carrying out the hydrogenation at a temperature of $\geq 250°$ C. and a pressure of between about 0.5 to 5 MPa.

2. The method of claim 1, wherein the initial hydrogenation is carried out under thorough mixing by constant stirring.

* * * * *